Dec. 15, 1931.  A. N. EMMONS  1,836,457
BENCH MOUNTING FOR PORTABLE ELECTRIC POWER SAWS
Filed July 29, 1930   2 Sheets-Sheet 1
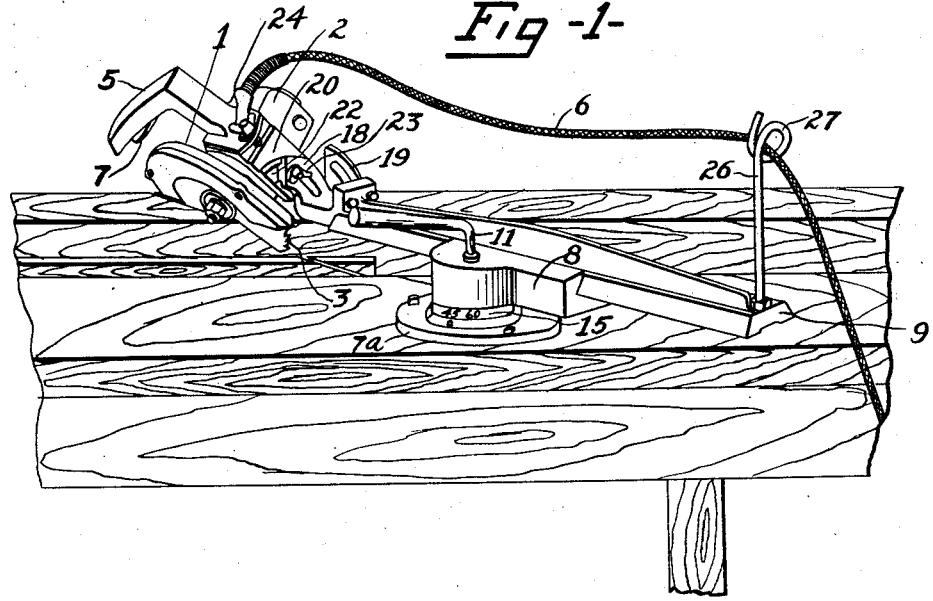
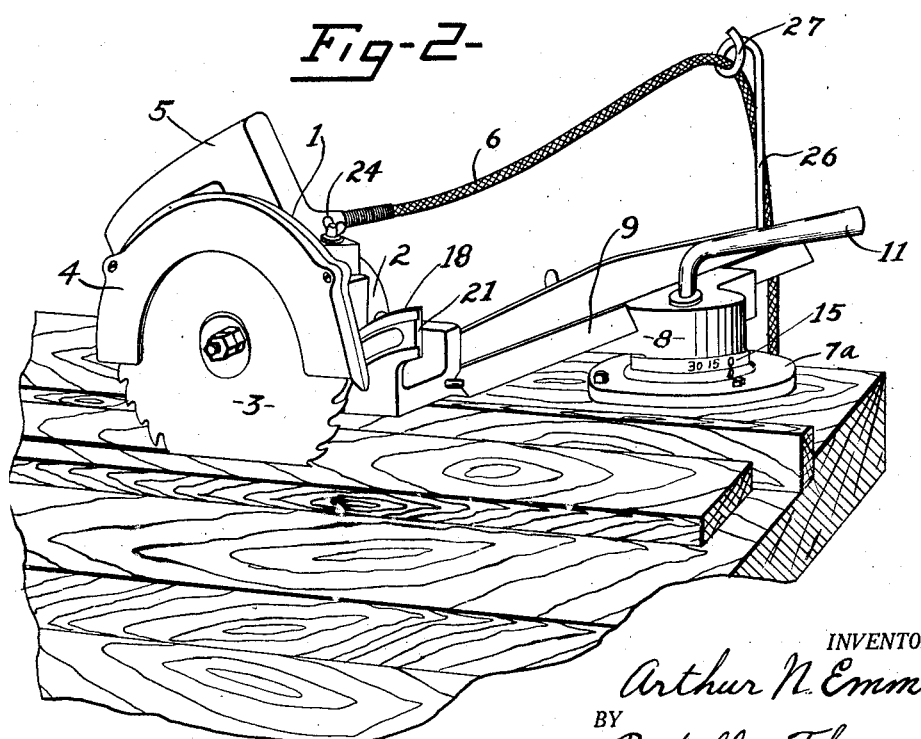
INVENTOR.
Arthur N. Emmons
BY
Bodell & Thompson
ATTORNEYS.

Dec. 15, 1931.  A. N. EMMONS  1,836,457
BENCH MOUNTING FOR PORTABLE ELECTRIC POWER SAWS
Filed July 29, 1930  2 Sheets-Sheet 2
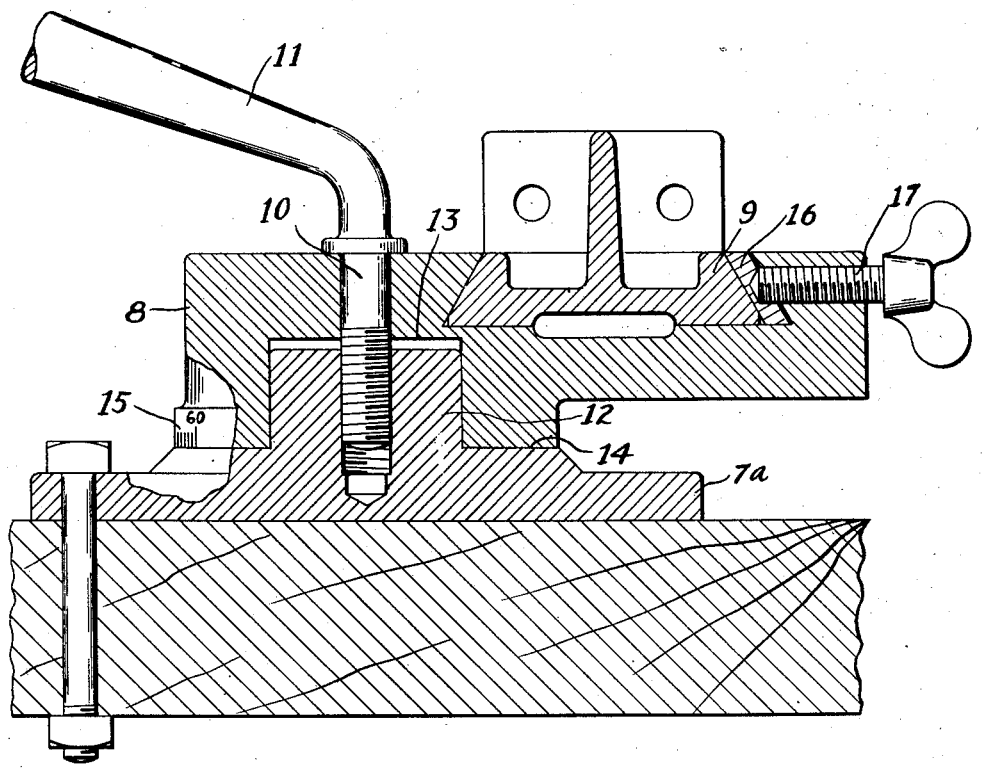
Fig-3-
INVENTOR.
Arthur N. Emmons
BY
Bodell + Thompson
ATTORNEYS.

Patented Dec. 15, 1931

1,836,457

UNITED STATES PATENT OFFICE

ARTHUR N. EMMONS, OF SYRACUSE, NEW YORK

BENCH MOUNTING FOR PORTABLE ELECTRIC POWER SAWS

Application filed July 29, 1930. Serial No. 471,499.

This invention has for its object a particularly simple support for portable power hand saws by which the saw can be mounted on a bench and serve as a bench saw, and also means by which the power saw is interchangeably mountable to serve as a rip saw or to serve as a cross cut saw to cut surfaces at various angles both transversely of the work or at different angles to the side edges of the board being cut as in mitering operations or at different angles inclined out of the vertical plane to form the work or board with beveled ends such as are required for jackrafters.

The invention consists in the novel features and in the combinations and constructions hereinafter set forth and claimed.

In describing this invention reference is had to the accompanying drawings in which like characters designate corresponding parts in all the views.

Figure 1 is a perspective view illustrating my invention as supporting a power hand saw to cut the work to provide a beveled butt end which is at an angle to the side edges of the work or board.

Figure 2 is a similar view illustrating the support and the saw attached thereto when used as a rip saw.

Figure 3 is an enlarged transverse sectional view through the support by means of which the saw is attached to a work bench.

This invention comprises, generally, means for mounting a portable power saw on a bench so that it can be used as a stationary bench saw to make lengthwise cuts or as a rip saw, or for mounting to make cross cuts at various angles transversely of the work at various inclined planes so that the butt end of the work may be cut square or beveled. For cross cutting, the work is held stationary against a suitable stock and the saw is pulled through the work. For ripping, the saw is adjusted to position and held stationary and the work is fed under the saw.

1 designates generally the portable power hand saw. The construction of this saw per se forms no part of this invention. The saw consists of a rigid frame or body 2 in which is mounted an electric motor to the rotor of which the rotary saw blade 3 is connected. The saw blade is usually mounted directly upon the rotor or an extension of the shaft thereof. The frame also is provided with a suitable guard 4 for the saw and with a rigid handle 5. The electric current is supplied to the motor through suitable feed wires 6 and the actuation of the motor is controlled by a switch having a grip handle 7 associated with the handle 5. These features form no part of the invention.

The means for supporting the saw on a bench so that the saw can be used as a bench saw, comprises a base $7^a$ mountable on the bench or other analogous support, a block 8 swivelled on the base $7^a$ so that it is adjustable about an upright axis and an arm or bar 9 slidably and adjustably mounted in the block in a substantially horizontal position so as to be shiftable transversely of the block and coacting means at one end of the bar and on the body 2 of the saw for securing the saw to the bar and arranging the saw in different angular positions, both to be used as a rip saw and a cross cut saw and to make cross cuts at different angles in two planes relatively to the work. Preferably, the bar or arm 9 slides transversely of the block at one side of or eccentrically to, the axis of the swivel joint between the block and the base $7^a$.

The block 8 is secured against swivelling movement against the base $7^a$ by any suitable means as a clamping screw 10 having a handle 11, the screw extending through and turning in the block 8 and threading into the base $7^a$. The swivel joint is provided by an upstanding stud 12 formed integral with the base and of comparatively large diameter and a corresponding recess 13 in the block. The block also has a bearing at 14 on the base $7^a$ around the base of the stud 12. The joint between block 8 and the base $7^a$ is such that looseness and rocking of the block is avoided. A suitable scale or gage 15 is provided for determining the angle of the arm 9 and hence the angle of the cross cut. When making cross cuts, the bar slides endwise relatively to the block as the saw is pulled across the work, but when the saw is set for lengthwise cutting or rip saw work, the bar or arm 9 is clamped to the block against endwise movement.

In the illustrated embodiment of my invention, the block is formed with a groove or way and the arm or bar 9 fits the way, the way being provided with undercut walls and the arm with complemental walls. A gib 16 is provided with one edge of the bar and the adjacent side of the groove or way and this is tightened by means of a screw 17 to hold the bar or arm 9 from endwise movement.

The saw body is interchangeably mountable on the end of the bar 9 in two positions and is also adjustable in either of these positions.

In the illustrated embodiment of my invention, the means for mounting the saw body on the bar 9 comprises a bearing part 18 extending transversely of the end of the bar and a bearing part 19 at the end of the bar and arranged at a right angle to the part 18 and a bearing part 20 fixed to and rigid with the saw body 2 and securable to either of the parts 18, 19. The part 20 extends in a plane at a right angle to the saw blade. These bearing parts 18, 20 and 19, 20 are provided with coacting guide means which is arcuate in general form, the arc extending in a general downward direction, and as shown, the part 18 is formed with an arcuate rib 21 and the part 20 with a complemental groove 22 for receiving the rib. Likewise, the part 19 is formed with a similar rib for interfitting with the groove 22 of the part 20. The coacting parts 18, 20 or 19, 20 are secured together by clamping screw 23 extending through an arcuate slot in the part 18 or 19 and threading into the part 20 on the saw body. This part 20 also has an adjustment relatively to the saw body effected by a screw 24 but this adjustment does not enter into the present invention.

In operation, assuming that the saw is mounted on the end bearing part 18, the bearing part will thus be arranged in a plane at an angle to the plane of the saw blade. Therefore, when the saw body is mounted upon the bearing part 18, the saw blade 3 extends in a general direction parallel to the axial line of the arm 9 or the direction of endwise movement of the arm 9. By loosening the screw 23 and tilting the saw by moving the saw body along the arcuate guide rib 21, the angle of the saw can be adjusted in a plane at a right angle to the work or at various inclined angles to the plane of the work so as to make a bevel cut. By loosening the clamping screw 10 and swinging the arm 9 and the block 8 about the swivel joint or stud 12, the incline of the cross cut can be varied. Thus having adjusted the angle of the arm 9 by means of the swivel joint and by tilting the saw to any angle from a right angle to the plane of the work to various angles, any cut required can be made and in fact the cutting of such work as jackrafters can be made with one cut as shown in Figure 1.

When the saw body is arranged with its bearing part 20 clamped to the bearing part 19, the saw will be in a position shown in Figure 2, wherein it is at a right angle to the axis of the arm 9 and the clamping screw 10 being tight, rip saw work can be done by feeding the work to the saw as the saw is stationary. The depth of the cut can be regulated by adjusting the bearing part 20 and the saw body 2 with screw 24.

As before stated the electric current is carried to the saw motor by means of the cable 6. Means is provided for keeping cable 6 out of the way when cross cutting. This means comprises a guide member 26 secured to the back end of the bar 9 and is provided on its upper end with a loop 27 formed in such a manner that the cable 6 may be easily inserted therethrough.

This invention is particularly advantageous in that it provides a simple and economical mounting for a portable saw whereby the saw can be used for bench work to quickly perform rip saw work, mitering and end cutting at various angles and bevels.

What I claim is:

1. The combination with a portable saw having a rigid body, of a support for mounting the portable saw on a bench whereby the saw can be used as a power saw, comprising a base attachable to the bench, a block swivelled on the base and formed with a transverse guide, means for clamping the block to the base, a saw supporting arm slidable along the guide, said arm having bearing parts at its outer end arranged at a right angle to each other and the saw body having a bearing part interchangeably mountable on either of the first mentioned bearing parts, said bearing parts being provided respectively with coacting arcuate guides and means coacting with the guides, the guides extending in a general downward direction, and the bearing part on the saw body being adjustable along the arcuate guides to carry the body and the block into different angular positions.

2. The combination with a portable power saw having a vertically adjustable bearing part for varying the depth of the saw cut, of a support for mounting a portable saw on a bench whereby the saw can be used as a power saw, comprising a base attachable to the bench, a block swivelled on the base and formed with a transverse guide, means for clamping the block to the base, a saw supporting arm slidable along the guide relatively close to the surface of the bench, said arm having bearing parts at its outer end arranged at right angles to each other and the bearing part of the saw body being interchangeably mountable on either of the former bearing parts and means for securing the coacting bearing parts together.

3. The combination with a portable power driven saw, of a support for mounting the portable saw on a bench whereby the saw can be used as a power saw, comprising a base attachable to the bench, a block swivelled on the base and formed with a transverse guide in its upper end, means for clamping the block to the base, a saw supporting arm slidable along said guide relatively close to the surface of the bench, said arm being provided with a bearing part extending transversely of its outer end and the saw having a complemental vertically adjustable bearing part coacting therewith, said bearing parts being provided with coacting arcuate guide means for permitting adjustment of the saw body about the axis of the supporting arm and means for securing the bearing parts together.

4. The combination with a portable power driven saw having a rigid body and a supporting part adjustable relative to the body of the saw for varying the depth of the cut, of a support for converting the portable saw into a bench type of saw, comprising a base attachable to the bench, a block swivelled on the base and formed with a transverse guide through its upper end, means for clamping the block to the base, a saw supporting arm slidable through said guide relatively close to the bench, said arm being provided with a bearing part having a surface extending transversely of the outer end of the arm and a surface extending parallel to the arm, the supporting part of the saw having a complemental bearing surface coacting with and interchangeable with either of the bearing surfaces on the saw arm and means for securing said parts together.

In testimony whereof, I have hereunto signed my name at Syracuse, in the county of Onondaga, and State of New York, this 25th day of July, 1930.

ARTHUR N. EMMONS.